(12) United States Patent
Berman et al.

(10) Patent No.: US 7,139,142 B2
(45) Date of Patent: Nov. 21, 2006

(54) DETERMINATION OF MAGNETIC TAPE WRITE QUALITY EMPLOYING WRITE EQUALIZATION TRANSITIONS

(75) Inventors: David Berman, San Jose, CA (US); Eric Rolf Christensen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 10/977,285

(22) Filed: Oct. 29, 2004

(65) Prior Publication Data

US 2006/0092539 A1 May 4, 2006

(51) Int. Cl.
*G11B 5/09* (2006.01)
*G11B 20/10* (2006.01)

(52) U.S. Cl. ................ 360/39; 360/48; 360/77.12; 360/41

(58) Field of Classification Search ............ None
See application file for complete search history.

(56) References Cited

U.S. PATENT DOCUMENTS

| | | | |
|---|---|---|---|
| 4,907,100 A * | 3/1990 | Nishiyama et al. ........... 360/45 |
| 5,255,130 A | 10/1993 | Buchan et al. ................. 360/41 |
| 5,267,096 A | 11/1993 | Buchan et al. ................. 360/41 |
| 5,339,202 A * | 8/1994 | Heinz et al. ................... 360/46 |
| 5,638,226 A * | 6/1997 | Koren ........................... 360/40 |
| 5,754,593 A * | 5/1998 | Koren ......................... 375/263 |
| 5,805,619 A * | 9/1998 | Gardner et al. ............. 714/814 |
| 5,872,665 A * | 2/1999 | Millican et al. .............. 360/46 |
| 6,055,117 A * | 4/2000 | Hansen et al. ................ 360/45 |
| 6,055,119 A * | 4/2000 | Lee ............................. 360/51 |
| 6,167,550 A * | 12/2000 | Gray ........................... 714/769 |
| 6,307,698 B1 * | 10/2001 | Ishitsuka ..................... 360/53 |
| 6,580,768 B1 * | 6/2003 | Jaquette ...................... 375/341 |
| 6,597,526 B1 * | 7/2003 | Gray ........................... 360/40 |
| 6,765,741 B1 * | 7/2004 | Berman et al. .............. 360/65 |
| 6,831,797 B1 * | 12/2004 | Koller et al. ................. 360/41 |
| 6,865,052 B1 * | 3/2005 | Chliwnyj et al. ......... 360/77.12 |
| 7,019,922 B1 * | 3/2006 | Howarth et al. ............. 360/39 |
| 2003/0123587 A1 * | 7/2003 | Blaum et al. ............... 375/354 |
| 2005/0259726 A1 * | 11/2005 | Farjad-rad .................. 375/232 |

* cited by examiner

*Primary Examiner*—Wayne Young
*Assistant Examiner*—Dismery Mercedes

(57) ABSTRACT

A signal sampler digitally samples magnetic signals detected by read head(s) of a magnetic tape drive, and a signal quality system extracts from the digital samples of a format required signal of the magnetic signals, such as a data set separator pattern, an estimated amplitude of write equalization transitions of the format required signal; and compares the extracted estimated amplitude to acceptable amplitude.

9 Claims, 6 Drawing Sheets

DETERMINATION OF MAGNETIC TAPE WRITE QUALITY EMPLOYING WRITE EQUALIZATION TRANSITIONS

FIELD OF THE INVENTION

This invention relates to magnetic tape drives, and, more particularly, to the write quality of signals recorded to magnetic tape.

BACKGROUND OF THE INVENTION

Magnetic tape cartridges provide a means to store data on magnetic tape to be saved and read back at a subsequent time. A source of variation of the readback of signals recorded to magnetic tape is the write quality of the recorded signals, which may be a function of the varying response of the write driver circuitry of various writing tape drives. This variation can become more apparent at high tape velocities during write. Magnetic tapes may be interchanged between tape drives, such that a magnetic tape written on one tape drive will be read by another tape drive. Variation in the response of the write driver circuitry between tape drives may thus result in unacceptably poor write quality for recorded signals when the attempt is made to read the signals by another tape drive.

SUMMARY OF THE INVENTION

Magnetic tape drives, logic and computer program products for a magnetic tape drive are provided. The magnetic tape drive may comprise at least one read head and a drive system for moving a magnetic tape with respect to the read head such that the read head may detect magnetic signals on the magnetic tape.

In one embodiment, a signal sampler digitally samples magnetic signals detected by the read head, providing digital samples of the magnetic signals; and a signal quality system extracts from the digital samples of a format required signal of the magnetic signals, an estimated amplitude of write equalization transitions of the format required signal; and compares the extracted estimated amplitude to acceptable amplitude.

In a further embodiment, the signal quality system extracts the estimated amplitude, additionally constructing a synthetic pulse representing a least squares fit to the digital samples, where one of the fitting criteria is the amplitude of the write equalization transitions.

In a still further embodiment, the signal quality system additionally constructs the synthetic pulse by conducting a multi-dimensional minimization of mean squared error between the synthetic pulse and the digital samples, one of the multi-dimensions comprising the amplitude of the write equalization transitions.

In another embodiment, the signal quality system additionally constructs the synthetic pulse convolving a quasi-Lorentizian pulse of pulsewidth "a" and exponent "e", with a sequence of signed NRZI transitions corresponding to a binary sequence of the format required signal having write equalization transitions.

In still another embodiment, the signal sampler additionally separates the digital samples of positive "data" transitions of the detected signal and the digital samples of negative "data" transitions; and the signal quality system separately extracts from the digital samples of the positive "data" transitions an estimated amplitude of write equalization transitions of the format required signal, and from the digital samples of the negative "data" transitions an estimated amplitude of write equalization transitions of the format required signal.

In a further embodiment, the format required signal comprises a data set separator pattern, and the signal quality system extracts from the digital samples of the data set separator pattern as the format required signal.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
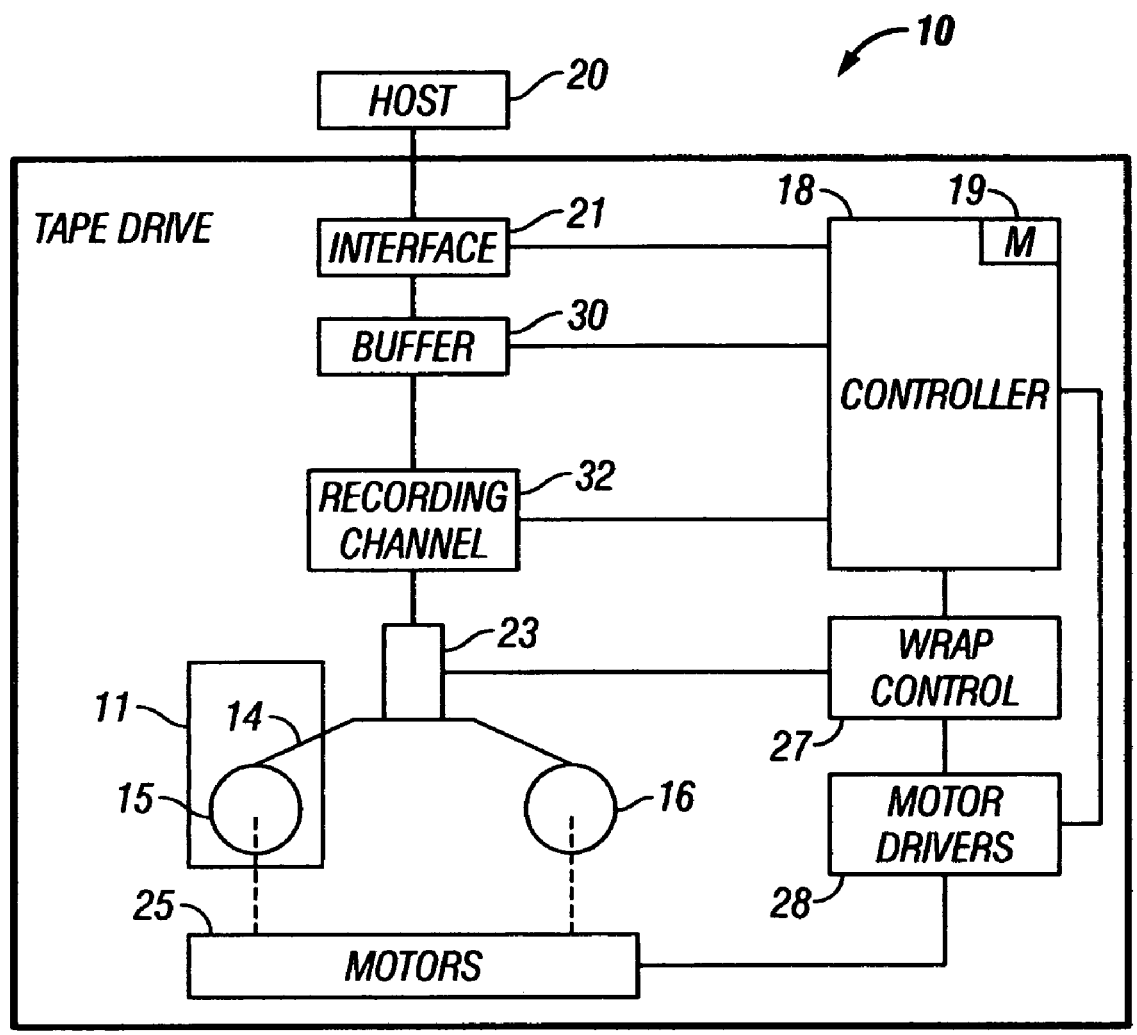
FIG. 1 is a block diagram of a magnetic tape drive which may implement an embodiment of the present invention.

Referring to FIG. 1, a magnetic tape drive 10 is illustrated which may implement aspects of the present invention. The magnetic tape drive provides a means for reading and writing information with respect to a magnetic tape 14 of a magnetic tape cartridge 11.

Magnetic tape cartridges provide a means to store data on magnetic tape to be saved and read at a subsequent time. Further, the magnetic tape cartridges may be interchanged between tape drives, such that a magnetic tape written on one tape drive will be read by another tape drive.

As is understood by those of skill in the art, a magnetic tape cartridge 11 comprises a length of magnetic tape 14 wound on one or two reels 15, 16.

A single reel magnetic tape cartridge 11 is illustrated, examples of which are those adhering to the Linear Tape Open (LTO) format. An example of a magnetic tape drive 10 is the IBM 3580 Ultrium magnetic tape drive based on LTO technology. A further example of a single reel magnetic tape drive and associated cartridge is the IBM 3592 TotalStorage Enterprise magnetic tape drive and associated magnetic tape cartridge. An example of a dual reel cartridge is the IBM 3570 magnetic tape cartridge and associated drive.

Also as is understood by those of skill in the art, a magnetic tape drive 10 comprises one or more controllers 18 of a recording system for operating the magnetic tape drive in accordance with commands received from a host system 20 received at an interface 21. A controller typically comprises logic and/or one or more microprocessors with a memory 19 for storing information and program information for operating the microprocessor(s). The program information may be supplied to the memory via the interface 21, by an input to the controller 18 such as a floppy or optical disk, or by read from a magnetic tape cartridge, or by any other suitable means. The magnetic tape drive 10 may comprise a standalone unit or comprise a part of a tape library or other subsystem. The magnetic tape drive 10 may be coupled to the host system 20 directly, through a library, or over a network, and employ at interface 21 a Small Computer Systems Interface (SCSI), an optical fiber channel interface, etc.

The magnetic tape cartridge 11 may be inserted in the magnetic tape drive 10, and loaded by the magnetic tape drive so that one or more read and/or write heads 23 of the recording system reads and/or writes information in the form of signals with respect to the magnetic tape 14 as the tape is moved longitudinally by one or more motors 25 which rotate the reels 15, 16. The magnetic tape typically comprises a plurality of parallel tracks, or groups of tracks. In some formats, such as the LTO format, above, the tracks are arranged in a serpentine back and forth pattern of separate wraps, as is known to those of skill in the art. Also as known to those of skill in the art, the recording system may comprise a wrap control system 27 to electronically switch to another set of read and/or write heads, and/or to seek and move the read and/or write heads 23 laterally on the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18.

Controller 18 also provides the data flow and formatter for data to be read from and written to the magnetic tape, employing a buffer 30 and a recording channel 32, as is known to those of skill in the art.

Figure 2:
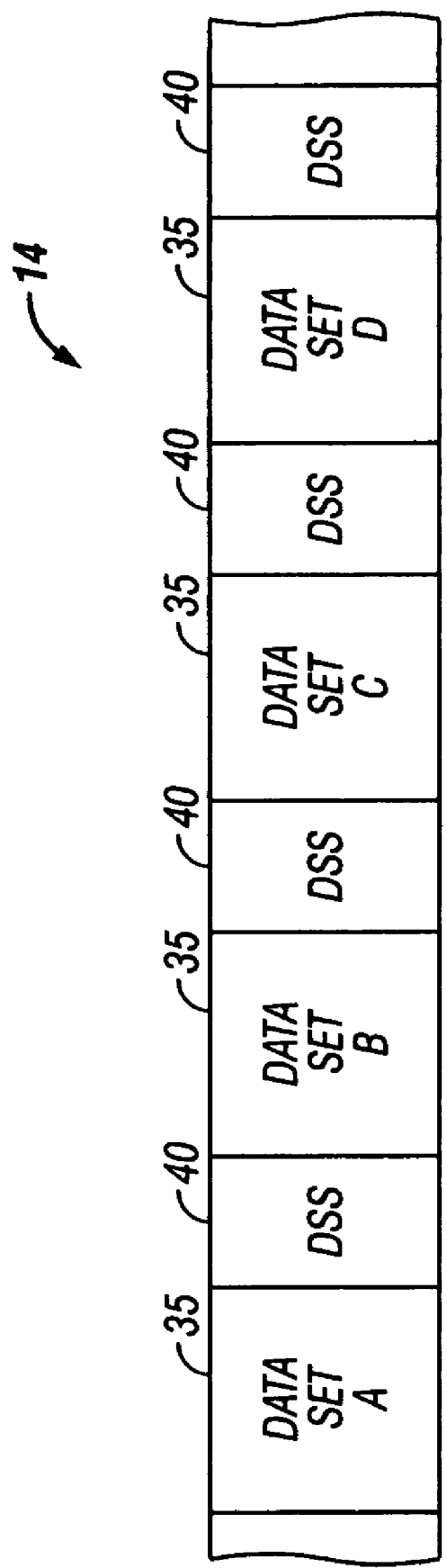
FIG. 2 is a diagrammatic illustration of data sets recorded on magnetic tape and separated by data set separator signals.

One example of a format is illustrated in FIG. 2 in which a magnetic tape 14 is written with a plurality of data sets 35 separated by data set separator signals 40. Data sets are typically arranged in accordance with a format and stored in a buffer 30 and separately written to the magnetic tape. Rather than have a large buffer with a large number of data sets arranged to write all the data sets without separation, or rather than stop the magnetic tape at the end of each data set and attempt to precisely align the beginning of the next data set at the end of a previous data set, magnetic tape formats typically separate the data sets by means of data set separator signals, which are typically signals of a particular frequency. The data set separator signals 40 are typically a specific format required signal, so that the data set separator signals are not confused with recorded information signals. Other format required signals are also often employed in magnetic recording, such as synchronization signals. The format required signals such as data set separator signals (DSS) are typically a waveform of a train of fairly isolated "data" magnetic transitions, and are also described as recorded binary "ones" separated by a sequence of "zeros" to establish the desired frequency as a distance between magnetic transitions. For example, the LTO Ultrium Generation 1 standard of DSS is a periodic repeating NRZI 9T pattern (one and eight zeros). In the LTO Ultrium Generation 2 standard, the DSS is a periodic repeating NRZI 12T pattern (one and eleven zeros).

Figure 3:
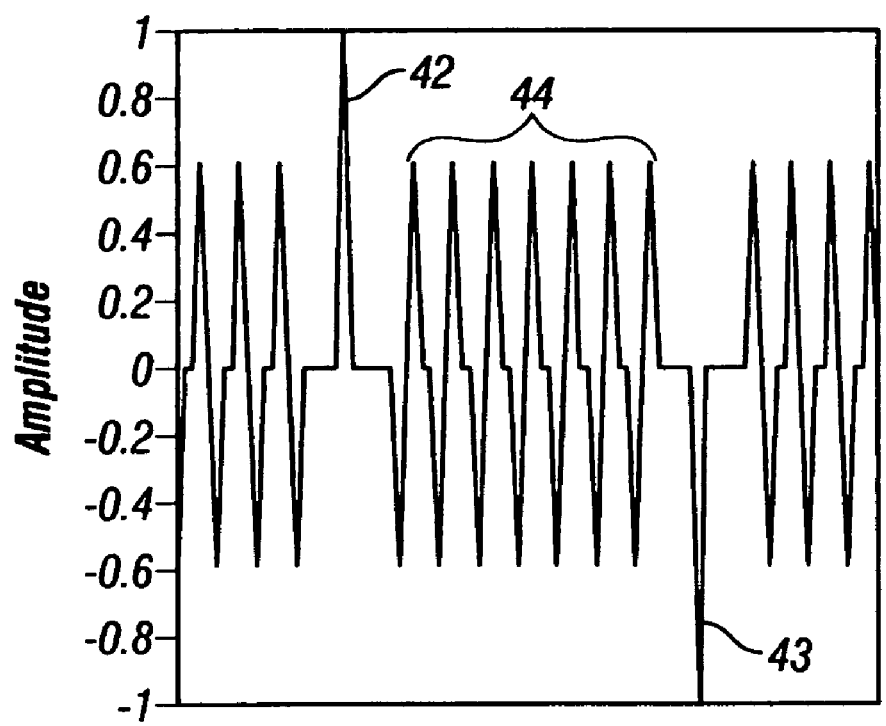
FIGS. 3 and 4 are diagrammatic illustrations of data set separator signals with write equalization transitions.
Figure 4:
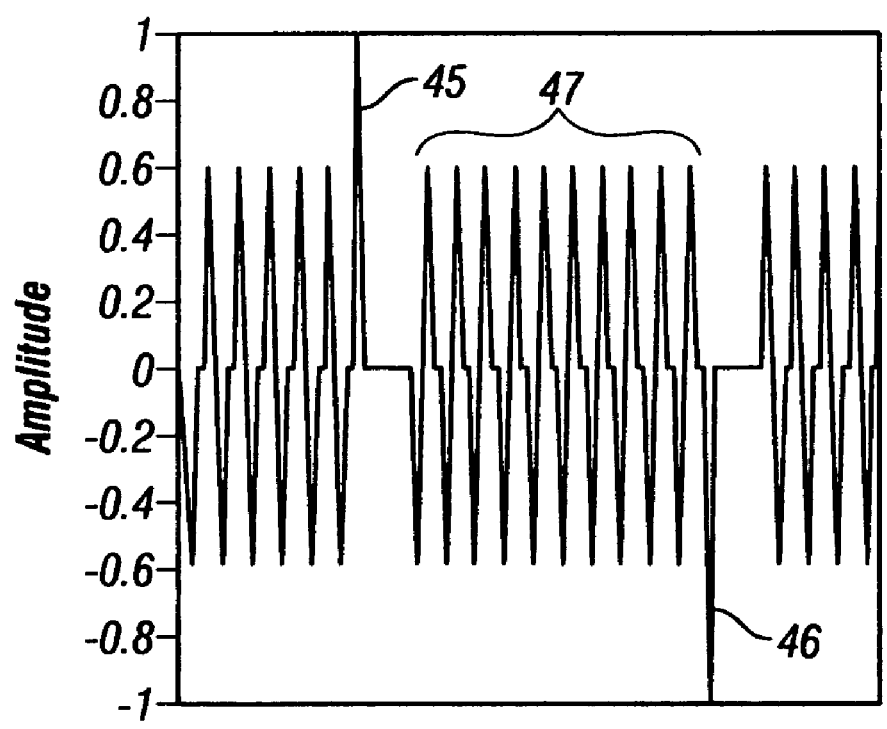

Waveform patterns such as DSS have a number of write equalization transitions intermediate the "data" transitions. The write equalization transitions balance tape magnetic remanance between maximum and minimum allowable transition spacings. This is done primarily for three reasons: 1) prevent nonlinear response of commonly used magnetoresistive readback transducers, 2) simplify signal processing requirements upon readback (e.g. read equalization boost), and 3) reduce readback waveform SNR degradation due to excessive read equalization boost. FIG. 3 illustrates an example of a write equalized transition sequence for a LTO Ultrium Generation 1 standard of DSS pattern of "data" transitions 42 and 43 of opposite polarities, and a plurality of write equalization transitions 44 that are of an amplitude of 0.6 of the "data" transitions. FIG. 4 illustrates an example of a write equalized transition sequence for a LTO Ultrium Generation 2 standard of DSS pattern of "data" transitions 45 and 46 of opposite polarities, and a plurality of write equalization transitions 47 that are of an amplitude of 0.6 of the "data" transitions. The readback of the resultant DSS pattern will comprise the "data" transitions, with the distortion minimized by the presence of the write equalization transitions.

Figure 5:
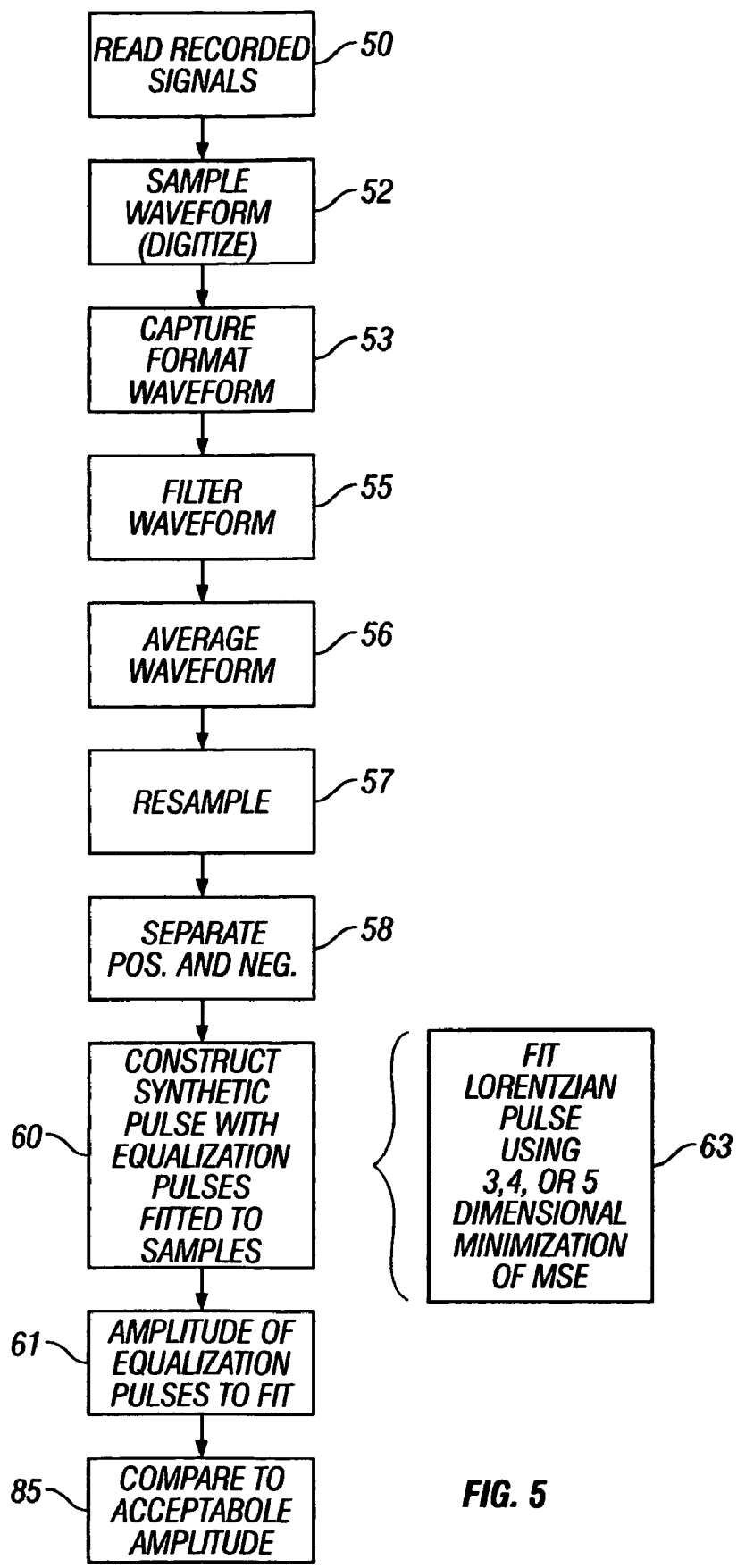
FIG. 5 is a flow chart depicting embodiments of the present invention for determining magnetic tape write quality.

FIG. 5 comprises embodiments of the present invention for determining magnetic tape write quality from recorded signals read in step 50. The embodiments of FIG. 5 may be implemented in logic, such as logic forming a part of the recording channel 32 of FIG. 1, logic implemented in a controller 18 of FIG. 1, may be implemented as a computer program product operating a programmable computer processor, such as a computer processor comprising a controller 18 of FIG. 1, or may be implemented by remote logic or as a computer program product operating a remote programmable computer processor, such as host 22 of FIG. 1. Still further, the readback signals, or sampling data thereof, may be collected and the magnetic tape write quality determined by logic or a computer processor, such as host 22 of FIG. 1, or a specially programmed test computer processor, at a subsequent time.

A preliminary optional step comprises obtaining a magnetic tape that has been at least partially written with any desired data in the appropriate format. The recorded signals are then read in step 50 of FIG. 5. The recording channel 32 of the magnetic tape drive 10 of FIG. 1, in step 52 of FIG. 5, samples the waveform of the recorded signals and digitizes the waveform samples. For example, the sample rate is greater than the data clock. Step 53 comprises triggering the DSS waveform and capturing a required format signal, such as DSS.

The write quality test of the present invention may be performed on a single read channel, meaning a single track of the magnetic tape, or may be performed on multiple read channels, meaning a plurality of parallel tracks of the magnetic tape. Further, the test may be performed for both forward and reverse directions.

For best results, in step 53, a plurality of the required format signals are captured in a pass, such that the captured waveforms may be averaged to reduce the effects of noise.

Another optional step comprise step 55, in which the captured DSS waveform is filtered with a low-pass filter.

As one example, a cutoff frequency of the filter is set to 0.5/samprate and the number of coefficients to 33*samprate. The samprate comprises the ratio of the sampling frequency to the bit frequency, and may be established in advance by means of an initial guess of the number of samples per bit in the captured waveform.

The correct sampling rate is calculated by performing peak detection on the filtered input waveform. The peak detection is performed with an amplitude threshold equal to 0.5 times the maximum absolute waveform amplitude. The first two peaks and the last two peaks are discounted to avoid filter convolution effects at waveform endpoints. The average and standard deviation of the peak spacing is calculated. The peak spacings that fall within one standard deviation from the mean are selected, and the correct sampling rate value is calculated from the average of those spacings. The correct sampling rate is calculated as:

$$s = \frac{\bar{p}}{12},$$

where s is the correct sampling rate and $\bar{p}$ is the average peak spacing used, the denominator of 12 corresponds to the number of bits between adjacent peaks in the DSS waveform. The waveform is truncated at 6 bits before the first valid peak and 6 bits after the last valid peak. If the position of the first valid peak is less than 6 bits into the waveform, the waveform is truncated at 6 bits before the third valid peak. The truncation is performed to ensure that the waveform begins and ends with a low amplitude value. If the resulting waveform contains less than two full periods of the DSS field, processing is stopped, since there are not enough samples to perform reliable averaging.

If the difference between the correct sampling rate and the initial sampling rate guess is more than 5%, the low pass filtering described above is performed again with the correct sampling rate. Prior to the low pass filtering, the waveform is truncated at the end so that the length corresponds to an integer number of periods and then rotated such that the first positive peak is at bit position 6.

Step 56 is another optional step and comprises waveform averaging to reduce the effects of noise. To conduct the averaging, steps 53 and 55 ensure that the number of samples in one DSS period is an integer. Therefore, the desired sampling rate is the closest value to the actual waveform sampling rate that results in an integer number of samples in one DSS cycle. If the difference between the desired sampling rate and the actual sampling rate is greater than 5%, the filtered waveform is resampled in step 57 with the desired sampling rate using linear interpolation.

One example of waveform averaging of step 56 comprises averaging the waveform in blocks of 8 periods of complete DSS waveforms. The samples from each 8-period block are averaged to one period. A constant frequency and phase is assumed over each 8-period block. Rotate each average so that the positive peak is at bit position 6.

One example of resampling of step 57 comprises resampling each averaged waveform to 5 samples per bit. The resampling is done while ensuring that the DSS positive peak center falls exactly in the middle of the half-period, which is at bit 6, or at sample 30 and the negative peak center falls at sample 90, or bit 18. This is done with the following procedure:

If the initial sampling rate is less than 50 samples per bit, upsample first to 50 samples per bit and then downsample to 5 samples per bit, choosing the appropriate phase. Prior to upsampling to 50 samples per bit, the averaged waveform is period extended by a half period both at the beginning and at the end. The second half of the averaged period is appended at the beginning and the first half of the period is appended at the end. This precaution is taken to ensure waveform continuity at the period boundaries when convolving with the upsampling function. The extended averaged waveform is zero stuffed with N zeros, where $$N = \text{ceil}\left(\frac{50}{s}\right) - 1,$$

and s is the waveform sampling rate. The upsampling is performed by convolving the zero stuffed extended averaged DSS period with the raised cosine sin(x)/x function, using a bandwidth parameter of $\alpha=0.209$ in the expression below:

$$x(t) = \frac{\sin\frac{\pi t}{T}}{\frac{\pi t}{T}} \frac{\cos\frac{\alpha \pi t}{T}}{1-\left(\frac{2\alpha t}{T}\right)^2}$$

Here, T=5, and t is an integer vector from −250 to +250. After convolution, the sections of the averaged waveform that were added at the beginning and the end of the period are dropped. The result is one full average DSS period sampled at 50 samples per bit without any endpoint boundary effects at the beginning and the end. Then, downsampling is done with linear interpolation, choosing the appropriate phase to position the positive peak center at bit 6 and the negative peak center at bit 18. The first half period and the second half period are resampled separately to ensure accuracy in positioning both the positive and negative peak centers at the appropriate locations.

As a further example, if the initial sampling rate is more than 50 samples per bit, linear interpolation is used to directly downsample to 5 samples per bit without any upsampling. The first and second half periods are downsampled separately. The resampled waveform for both the positive and negative DSS pulse is 60 samples long with the peak center in each case located at sample 30.

After resampling, average all resampled averaged waveforms to produce a single, averaged DSS period with a sampling rate of 5 samples per bit with the positive peak at sample 30 and negative peak at sample 90. The last averaging step does not result in any pulse widening effects since all the resampled block averages are phase aligned.

Steps 50–57 may be repeated separately with respect to the positive and negative pulses of each DSS waveform, comprising positive pulses 42 and negative pulses 43 of FIG. 3 or positive pulses 45 and negative pulses 46 of FIG. 4, and the digital samples of the positive pulses and negative pulses are separated in step 58.

The function of steps 50, 52 and 53, and the optional steps 55, 56, 57 and 58 are preliminary to the present invention, which extracts from the digital samples of the format required signal, an estimated amplitude of write equalization transitions of the format required signal, and compares the extracted estimated amplitude to acceptable amplitude(s).

The estimated amplitude of write equalization transitions is determined, in one embodiment, by, in step 60, constructing a synthetic pulse representing a least squares fit to the digital samples, to, in step 61, where one of the fitting criteria is the amplitude of the write equalization transitions. The synthetic pulse may be fitted to the samples by conducting a multi-dimensional minimization of mean squared error between the synthetic pulse and the digital samples, where one of the multi-dimensions comprises an amplitude of the write equalization transitions.

In one embodiment, as illustrated in step 63 as one embodiment of step 60, together with step 61, the synthetic pulse comprises a quasi-Lorentzian pulse. Lorentzian pulses are known to those of skill in the art and comprise a formula of Lorentz that is adapted for manipulation. The synthetic pulse comprises a convolution of a quasi-Lorentzian pulse and a write equalization function.

A quasi-Lorentzian pulse is defined by the following equation:

i. $L(x) = \dfrac{1}{1 + \left|\dfrac{2x}{a}\right|^{e1}}$, for $x \leq 0$ ii. $L(x) = \dfrac{1}{1 + \left|\dfrac{2x}{a}\right|^{e2}}$, for $x > 0$ b. where,
c. x is distance (or time) from the transition point,
d. a is the pulse width term (normally defined as PW50 for a Lorentzian pulse),
e. e is the exponent (a usual Lorentzian pulse has a value of 2), which has two values: e1, for x negative (leading edge), and e2, for x positive (trailing edge).

A small difference in the values of parameters e1 and e2 can change the pulse shape slightly and also account for phase asymmetry between leading and trailing edges of the pulse. Hence, in step 58 of FIG. 5, the positive and negative transitions are treated separately. The write equalization function, which is convolved with the quasi-Lorentzian pulse, is a function with positive and negative pulses occurring at and having the same sign as the transitions of the write current waveform, including write equalization. The pulses corresponding to write current transitions that would have existed without write equalization may be considered to have unity amplitude, while those corresponding to the leading and trailing edges of the write equalization pulses will have fractional amplitudes, defined herein as $WEQ_1$ and $WEQ_2$, respectively.

In step 63 of FIG. 5, a series of step responses are created and superimposed to create more than one full cycle of the write-equalized DSS pattern synthetically for error minimization with the averaged DSS pulse. Positive and negative pulses are treated separately. In one embodiment, a pulse from the central part of the synthetic sequence is extracted for the error minimization, using parameters a, e1, e2, $WEQ_1$ and $WEQ_2$. A minimization routine is then used to vary the parameters a, e1, e2, $WEQ_1$ and $WEQ_2$ to achieve the minimum mean square error between the measured DSS pulse and that simulated using the aforementioned parameters. Separate calculations are made for positive-going and negative-going DSS pulses to minimize the effects of head amplitude asymmetry. In this embodiment, the mean of $WEQ_1$ and $WEQ_2$ are calculated for both the positive and negative DSS pulse waveforms and these numbers are used as the measures of write quality.

Alternatively, in step 63 of FIG. 5, certain of the parameters may be combined and assumed to have the same value. Thus, e1=e2=e, and/or $WEQ_1=WEQ_2=WEQ$, so the minimization routine may optionally comprise a 3, 4 or 5 parameter fit.

Step 60, and the resultant step 61, and the embodiment thereof in step 63, comprise curve fitting.

In the example of handling positive and negative pulses separately, the simulated write equalized waveform curve fitting is performed for both positive and negative DSS pulses separately. In the embodiment of step 63, a quasi-Lorentzian pulse of the equation above with parameters a, e1, and e2 is convolved with a signed NRZI binary transition sequence corresponding to the write-equalized DSS pattern.

In one example, the expression for the quasi-Lorentzian pulse, x is an integer vector from −500 to +500. Each value of the x vector is divided by 5, which is the sampling rate of the simulated DSS pulse. The simulated DSS pulse shall be extracted from the middle pulse of a waveform constructed from three equally spaced pulses, with an inner spacing of 12 bits with 50 leading and 50 trailing zeros. For the write-equalized transitions, use transition amplitudes $WEQ_1$ and $WEQ_2$. In the example, the simulated DSS waveform has a sampling rate of 5 samples/bit.

A mean squared error (MSE) is calculated between the captured DSS pulse and the simulated DSS pulse, using the following equation:

i. $mse = \dfrac{1}{N}\sum\limits_{x=1}^{N}[norm(L(a, e1, e2, weq_1, weq_2, x)) - norm(D(x))]^2$ In one example,
a. N=60 samples with the peak center located at sample 30,
b. L is the simulated DSS pulse,
c. D is the captured DSS pulse,
d. norm( ) is a normalization function that divides the input vector by its peak value.

Perform a 5-dimensional minimization of the MSE. One example of a minimization algorithm known to those of skill in the art comprises a downhill simplex method.

In the above 5-dimensional minimization example, the variable parameters in the minimization procedure are a, e1, e2, WEQ1 and WEQ2. The parameter set that results in the minimum MSE is output. During the minimization procedure, the following restrictions are imposed:

a. $0 \leq weq_1, weq_2 \leq 1$
$0 \leq e_1 - e_2 \leq 0.5$

The first restriction is a physical one: the write equalization transition amplitude cannot be negative, nor can it be greater than the maximum value, normalized to 1. The second requirement arises from experimental observations that un-write-equalized pulses have a faster rise than fall. The upper limit of 0.5 on the difference between e1 and e2 ensures stable operation of the minimization algorithm. The restrictions are imposed in the minimization routine by multiplying the MSE 100-fold if the parameters fall outside the permitted range. This ensures that the minimization algorithm never outputs parameters disallowed by the restrictions.

The initial simplex for the minimization routine is shown in the following matrix:
a. a=[3.8, 2.8, 3.2, 3, 2.4, 2.9]
b. e1=[3.0, 2.8, 2.0, 1.9, 2.4, 2.2]
c. e2=[2.7, 2.6, 1.7, 1.75, 2.1, 2.15]
d. WEQ1=[0.04, 1, 0.5, 0.6, 0.34, 0.8]
e. WEQ2=[0.01, 0.98, 0.5, 0.61, 0.33, 0.85]

Each row in the matrix represents a parameter dimension in the minimization, and each element in each row is a separate point in that dimension. Therefore, in the 5-dimensional minimization, the simplex consists of 6 points or vertices. In the example, the convergence conditions are: the maximum number of loop iterations is 300 and the minimum distance between the maximum error point and the minimum error point in the simplex is 1 e–4. When either of these conditions is met, the minimization algorithm stops.

Other minimization algorithms may be employed as are known to those of skill in the art.

The resultant minimization provides, in step 61, the amplitude of the write equalization pulses that provide the best fit.

Figure 6:
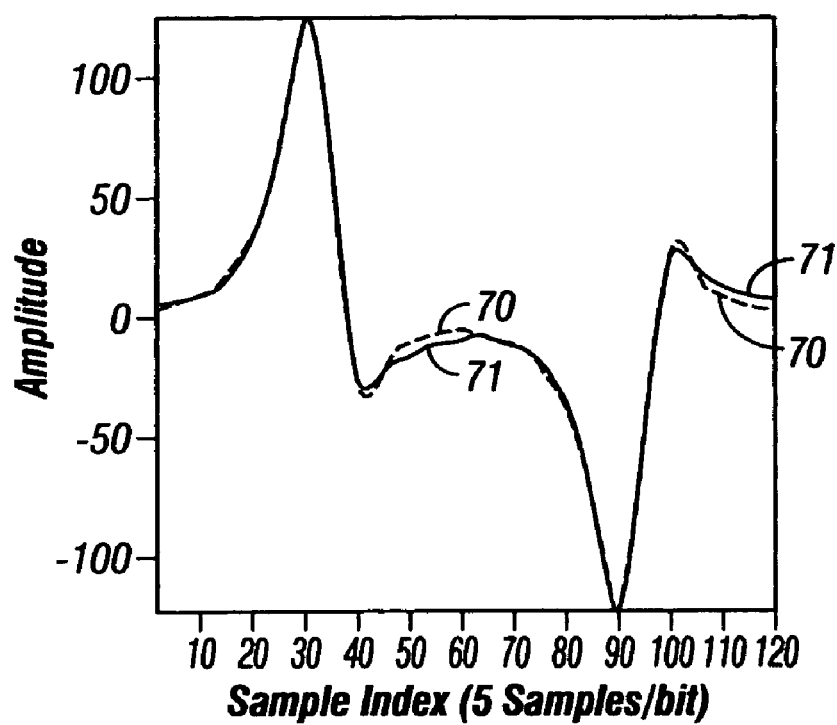
FIGS. 6, 7 and 8 are graphical representations of sampled data set separator signals and of synthetic pulses for extracting the estimated amplitude of the write equalization transitions of the sampled data set separator signals.
Figure 7:
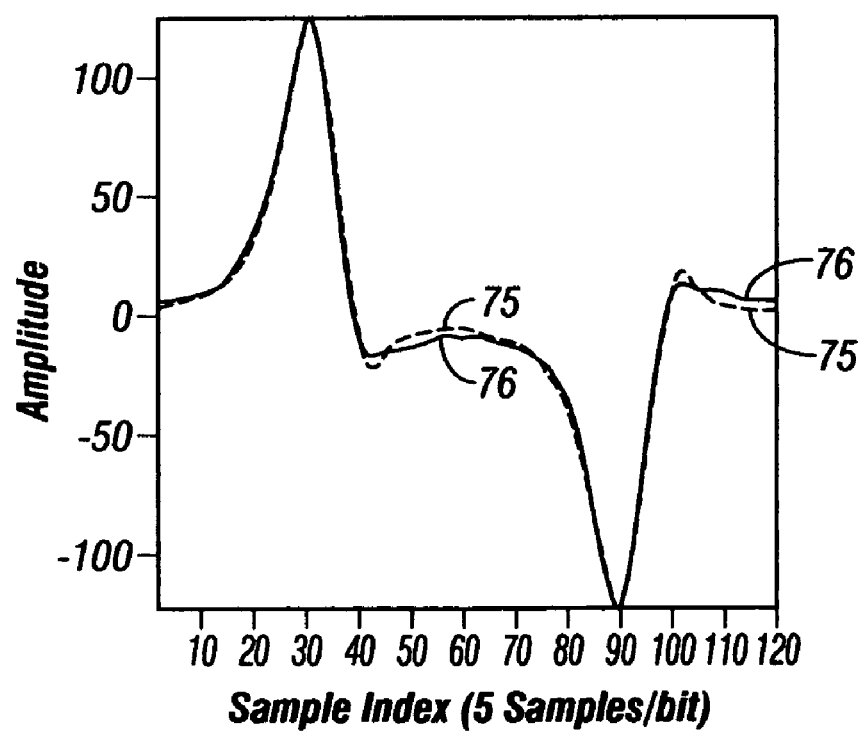
Figure 8:
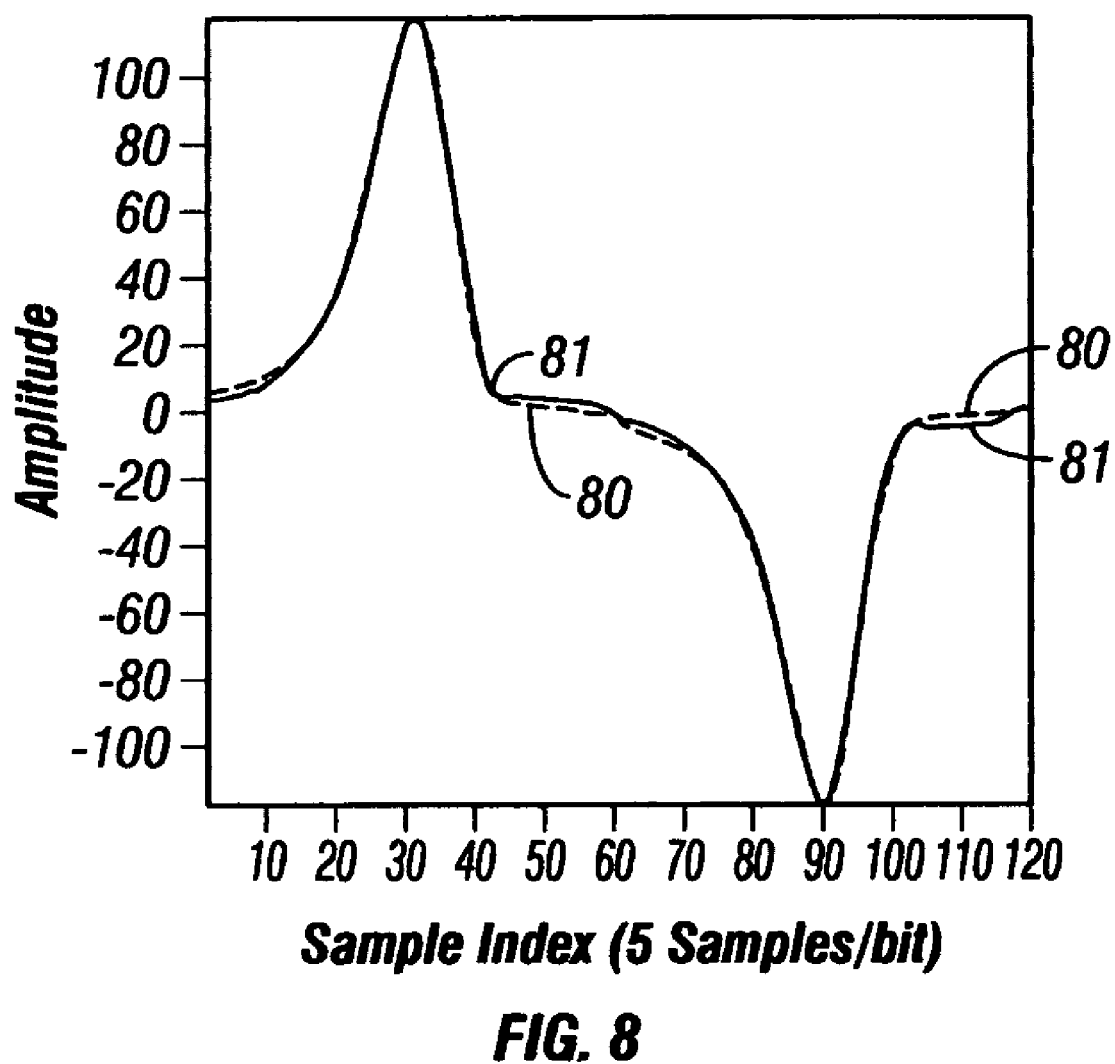

FIGS. 6, 7 and 8 illustrate examples of quasi-Lorentzian pulses fitted to digital samples of a format required signal of the magnetic signals.

In FIG. 6, the quasi-Lorentzian pulse 70 is fitted to the digital samples of the DSS format required signal represented by graph 71. The quasi-Lorentzian pulse 70 in an example, has the variable parameters in the minimization procedure of $a_P=3.01$, $a_N=3$, $e_P=2.07$, $e_N=2.07$, $WEQ_P=0.91$ and $WEQ_N=0.91$.

In FIG. 7, the quasi-Lorentzian pulse 75 is fitted to the digital samples of the DSS format required signal represented by graph 76. The quasi-Lorentzian pulse 75 in an example, has the variable parameters in the minimization procedure of $a_P=3.07$, $a_N=3.07$, $e_P=2.14$, $e_N=2.14$, $WEQ_P=0.81$ and $WEQ_N=0.81$.

In FIG. 8, the quasi-Lorentzian pulse 80 is fitted to the digital samples of the DSS format required signal represented by graph 81. The quasi-Lorentzian pulse 80 in an example, has the variable parameters in the minimization procedure of $a_P=3.2$, $a_N=3.2$, $e_P=2.24$, $e_N=2.24$, $WEQ_P=0.56$ and $WEQ_N=0.56$.

In step 85 of FIG. 5, the extracted estimated amplitude of step 61 is compared to acceptable amplitude(s) of the write equalization transitions. In the example of DSS pulses for an LTO magnetic tape, an acceptable amplitude of the write equalization transitions is in the range of 1.0 to 0.6. Hence, in the examples of FIGS. 6, 7 and 8, both the amplitudes of the write equalization transitions $WEQ_P$ and $WEQ_N$ for the minimized pulse 70 of FIG. 6, and for the minimized pulse 75 of FIG. 7 are within the acceptable range, and the write quality is acceptable; and both the amplitudes of the write equalization transitions $WEQ_P$ and $WEQ_N$ for the minimized pulse 80 of FIG. 8 are outside the acceptable range. Thus, the write quality for the minimized pulse 80 of FIG. 8 is not acceptable.

Those of skill in the art will understand that changes may be made with respect to the algorithms implemented in the examples. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A magnetic tape drive comprising:
    at least one read head;
    a drive system for moving a magnetic tape with respect to said at least one read head such that said at least one read head may detect magnetic signals on said magnetic tape;
    a signal sampler for digitally sampling magnetic signals detected by said at least one read head, providing digital samples of said magnetic signals; and
    a signal quality system for extracting from said digital samples of a format required signal of said magnetic signals, an estimated amplitude of write equalization transitions of said format required signal; and for comparing said extracted estimated amplitude to acceptable amplitude; wherein said signal quality system for extracting said estimated amplitude, additionally for constructing a synthetic pulse representing a least squares fit to said digital samples, where one of the fitting criteria is the amplitude of said write equalization transitions; wherein said signal quality system additionally for constructing said synthetic pulse conducting a multi-dimensional minimization of mean squared error between said synthetic pulse and said digital samples. one of said multi-dimensions comprising said amplitude of said write equalization transitions; wherein said signal quality system additionally for constructing said synthetic pulse convolving a quasi-Lorentizian pulse of pulsewidth "a" and exponent "e", with a sequence of signed NRZI transitions corresponding to a binary sequence of said format required signal having write equalization transitions.

2. A magnetic tape drive comprising:
    at least one read head;
    a drive system for moving a magnetic tape with respect to said at least one read head such that said at least one read head may detect magnetic signals on said magnetic tape;
    a signal sampler for digitally sampling magnetic signals detected by said at least one read head, providing digital samples of said magnetic signals; and
    a signal quality system for extracting from said digital samples of a format required signal of said magnetic signals, an estimated amplitude of write equalization transitions of said format required signal; and for comparing said extracted estimated amplitude to acceptable amplitude; wherein said signal sampler additionally for separating said digital samples of positive "data" transitions of said detected signal and said digital samples of negative "data" transitiqns; and said signal quality system for separately extracting from said digital samples of said positive "data" transitions an estimated amplitude of write equalization transitions of said format required signal, and from said digital samples of said negative "data" transitions an estimated amplitude of write equalization transitions of said format required signal.

3. The magnetic tape drive of claim 2, wherein said format required signal comprises a data set separator pattern, and said signal quality system for extracting from said digital samples of said data set separator pattern as said format required signal.

4. Logic for a magnetic tape drive, said magnetic tape drive having a drive system for moving a magnetic tape with respect to at least one read head such that said at least one read head may detect magnetic signals on said magnetic tape; said logic comprising:
    a signal sampler digitally sampling magnetic signals detected by said at least one read head, providing digital samples of said magnetic signals; and
    a signal quality system extracting from said digital samples of a format required signal of said magnetic signals, an estimated amplitude of write equalization transitions of said format required signal; and comparing said extracted estimated amplitude to acceptable amplitude; wherein said signal quality system extracts said estimated amplitude, additionally constructing a synthetic pulse representing a least squares fit to said digital samples, where one of the fitting criteria is the amplitude of the said write equalization transitions; wherein said signal quality system additionally constructs said synthetic pulse conducting a multi-dimensional minimization of mean squared error between said synthetic pulse and said digital samples, one of said multi-dimensions comprising said amplitude of said write equalization transitions; wherein said signal quality system additionally constructs said synthetic pulse convolving a quasi-Lorentizian pulse of pulsewidth "a" and exponent "e", with a sequence of signed NRZI transitions corresponding to a binary sequence of said format required signal having write equalization transitions.

5. Logic for a magnetic tape drive, said magnetic tape drive having a drive system for moving a magnetic tape with respect to at least one read head such that said at least one read head may detect magnetic signals on said magnetic tape; said logic comprising:
 a signal sampler digitally sampling magnetic signals detected by said at least one read head, providing digital samples of said magnetic signals; and
 a signal quality system extracting from said digital samples of a format required signal of said magnetic signals, an estimated amplitude of write equalization transitions of said format required signal; and comparing said extracted estimated amplitude to acceptable amplitude; wherein said signal sampler additionally separates said digital samples of positive "data" transitions of said detected signal and said digital samples of negative "data" transitions; and said signal quality system separately extracts from said digital samples of said positive "data" transitions an estimated amplitude of write equalization transitions of said format required signal, and from said digital samples of said negative "data" transitions an estimated amplitude of write equalization transitions of said format required signal.

6. The logic of claim 5, wherein said format required signal comprises a data set separator pattern, and said signal quality system extracts from said digital samples of said data set separator pattern as said format required signal.

7. A computer program product usable with a programmable computer processor having computer readable program code embodied therein, said programmable computer processor for operating on digital samples of magnetic signals detected by at least one read head from a magnetic tape, said computer program product comprising:
 computer readable program code for causing said programmable computer processor to extract from said digital samples of a format required signal of said magnetic signals, an estimated amplitude of write equalization transitions of said format required signal; and
 computer readable program code for causing said programmable computer processor to compare said extracted estimated amplitude to acceptable amplitude; wherein said computer readable program code for causing said programmable computer processor to extract said estimated amplitude of write equalization transitions additionally causes said programmable computer processor to construct a synthetic pulse representing a least squares fit to said digital samples, where one of the fitting criteria is the amplitude of said write equalization transitions; wherein said computer readable program code for causing said programmable computer processor to extract said estimated amplitude of write equalization transitions additionally causes said programmable computer processor to construct said synthetic pulse conducting a multi-dimensional minimization of mean squared error between said synthetic pulse and said digital samples, one of said multi-dimensions comprising said amplitude of said write equalization transitions; wherein said computer readable program code for causing said progranimable computer processor to extract said estimated amplitude of write equalization transitions additionally causes said programmable computer processor construct said synthetic pulse convolving a quasi-Lorentizian pulse of pulsewidth "a" and exponent "e", with a sequence of signed NRZI transitions corresponding to a binary sequence of said format required signal having write equalization transitions.

8. A computer program product usable with a programmable computer processor having computer readable program code embodied therein, said programmable computer processor for operating on digital samples of magnetic signals detected by at least one read head from a magnetic tape, said computer program product comprising:
 computer readable program code for causing said programmable computer processor to extract from said digital samples of a format required signal of said magnetic signals, an estimated amplitude of write equalization transitions of said format required signal; and
 computer readable program code for causing said programmable computer processor to compare said extracted estimated amplitude to acceptable amplitude; wherein said digital samples are separated into digital samples of positive "data" transitions of said detected signal and digital samples of negative "data" transitions; and wherein said computer readable program code for causing said programmable computer processor to extract said estimated amplitude of write equalization transitions additionally causes said programmable computer processor to separately extract from said digital samples of said positive "data" transitions an estimated amplitude of write equalization transitions of said format required signal, and from said digital samples of said negative "data" transitions an estimated amplitude of write equalization transitions of said format required signal.

9. The computer program product of claim 8, wherein said format required signal comprises a data set separator pattern, and wherein said computer readable program code for causing said programmable computer processor to extract said estimated amplitude of write equalization transitions causes said programmable computer processor to extract said data set separator pattern as said format required signal.

* * * * *